United States Patent

[11] 3,594,992

| | | |
|---|---|---|
| [72] | Inventors | George P. Carr; Noel D. Hazzard, both of Wellsville, N.Y. |
| [21] | Appl. No. | 812,220 |
| [22] | Filed | Apr. 1, 1969 |
| [45] | Patented | July 27, 1971 |
| [73] | Assignee | The Air Preheater Company, Inc. Wellsville, N.Y. |

[54] CLEANING ARRANGEMENT FOR BAG FILTER
2 Claims, 4 Drawing Figs.

[52] U.S. Cl. ................................................. 55/302, 55/341, 55/368, 55/376
[51] Int. Cl. ................................................. B01d 46/04
[50] Field of Search ............................................ 55/293, 301—303, 341, 368, 376; 210/323, 333, 410—412, 456

[56] References Cited
UNITED STATES PATENTS

| 520,293 | 5/1894 | Blackmore | 210/410 |
| 2,068,332 | 1/1937 | Kneisley | 55/368 |
| 2,799,357 | 7/1957 | Warnecke et al. | 55/506 |
| 3,241,297 | 3/1966 | Hanes | 55/302 |
| 3,169,109 | 2/1965 | Hirs | 210/333 |
| 3,377,783 | 4/1968 | Young | 55/302 |
| 3,499,268 | 3/1970 | Pausch | 55/302 |
| 3,509,698 | 5/1970 | Medcalf et al. | 55/302 |

FOREIGN PATENTS

| 225,059 | 10/1959 | Australia | 55/302 |

OTHER REFERENCES

Mikro-Pulsaire Dust Collector Pulverizing Machinery Bulletin PC-2 New Jersey Slick Corporation pages 1— 12 Nov. 27, 1967 (A copy in 55-302)

Primary Examiner—Frank W. Lutter
Assistant Examiner—Bernard Nozick
Attorneys—Wayne H. Lang and Eldon H. Luther ABSTRACT: A cleaning arrangement for a bag filter whereby a jet of compressed air is directed from a nozzle into the bag filter and on to a novel deflector which divides the air into a portion that passes axially and a portion that is deflected radially. The portion passing axially thereof increases the pressure within the bag to cause the walls of the bag to flex outwardly and dislodge the dust cake on the outer surface thereof. The portion of the cleaning air from the nozzle that strikes the deflector is deflected radially on to walls of the filter bag also causing the flexing action which is propagated down the length of the bag to reinforce the action of the air which passes centrally therethrough.

PATENTED JUL 27 1971 3,594,992

INVENTOR.
George P. Carr
BY Noel D. Hazzard

Wayne H. Lang
AGENT

CLEANING ARRANGEMENT FOR BAG FILTER

BACKGROUND OF THE INVENTION

1. Field of the Invention

This invention relates to filtering devices having a tubular bag configuration generally made to include complex arrangements for removing accumulated dust cake from the filtering surfaces thereof. It is the usual practice to employ one of several types of shaking or oscillating mechanisms in which the vibrations are transmitted to the filter bags. When applications of this type are utilized it has been found that bags as a rule quickly deteriorate and fail, particularly in the regions of direct bag support. Such deterioration and failure reduces the collection efficiency greatly and as a result cleaning arrangements have been developed whereby only a blast of cleaning air on the surface of the cleaning element involved is necessary to remove the collected matter therefrom. Although the life expectancy of filter bags may be increased substantially by reducing the intensity of physical shaking or agitation used in removing the collected dust cake therefrom, the cleaning effectiveness of such an arrangement is also reduced so that only those deposits most readily removed from the surface of the filter are actually removed in the filter-cleaning process.

2. Description of Prior Art

Various attempts have been made to provide a bag filter arrangement wherein the gas flow therethrough was selectively reversed in the manner shown by U.S. Pat. No. 2,731,107 to remove accumulated dust particles from the outer surface thereof. While it has been found that some deposits are removed from the collecting surface of the filter, insufficient agitation of the filter bag by the blast of cleaning air usually results in a type of cleaning action that is less than that desired for optimum cleaning.

SUMMARY OF THE INVENTION

This invention therefore has as its chief objective the provision of an arrangement which effectively removes collected dust particles from the surface of the filter means without negatively affecting the surface thereof by causing excessive wear and abrasion.

Figure 1:
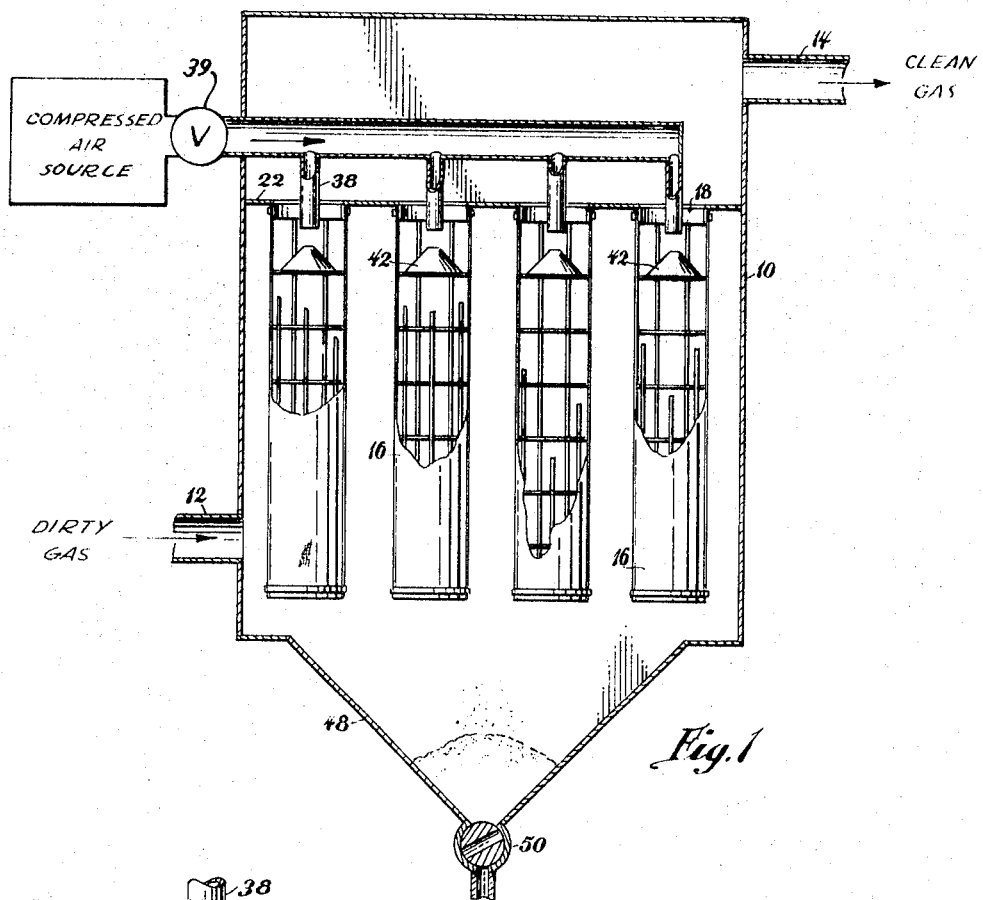
FIG. 1 is a vertical elevation through a filter arrangement constructed according to the present invention.

A housing 10 is formed with a lateral inlet 12 for dirty gas and an upper outlet 14 for gas which has been cleaned by passing through the openings or pores of the filter bag 16 therebetween. The filter bag 16 depends from a collar 17 secured by welding around each opening therein to the imperforate tube sheet 22 which extends across the housing 10.

A bag support having an upper support ring 18 fitting into the collar 17 has a bayonet-type connection arranged to lock it thereto by turning the bag support cage locking the slot 32 with the pins 34. The bag support cage includes a series of horizontal support rings 36 held in position by longitudinal stretchers 38'. A filter bag of the usual fabric construction is then stretched over the skeletal frame thus produced and is held in place by a clamp ring 46 held against the collar 18.

In accordance with usual procedure a nozzle 38 connected to a source of compressed air or other compressed gas is directed axially into the upper end of the filter bag 16 and a means 39 for intermittently exhausting a blast of gas from the source to the nozzle whereby a blast of air intermittently exhausted therefrom creates an elevated pressure within the bag. As the pressure within the bag increases the bag flexes outwardly, the dust cake is detached from the outer surface thereof and it is permitted to gravitate to the hopper 48 at the lower end of the housing from which it is eventually removed through removal gate 50.

While on most occasions a sudden increase of pressure within the bag is sufficient to flex the bag and dislodge a cake of collected dust from the outer surface thereof, an additional concentrated agitation of the bag is frequently desired to break the bond between the dust cake and the surface of the bag on which it has collected. Thus we provide a jet deflector 42 closely adjacent the outlet of the cleaning nozzle 38. The jet deflector is formed of corrosion- and erosion-resistant material of annular configuration whereby a portion of the blast of compressed air exhausting from the cleaning nozzle 38 is divided thereby to provide two separate but complementary cleaning actions. Accordingly a predetermined portion of the air passes axially through the central opening 44 of the deflector and expands below the jet deflector to create a momentary interruption of normal, dirty airflow through the filter. This sudden increase of pressure causes the walls of the fabric filter bag to slightly flex outwardly and dislodge the cake on the outer surface thereof in accordance with the usual procedure.

Simultaneously, the peripheral portion of the blast of cleaning air exhausting from the nozzle 38 strikes the jet deflector 42 and is given a radial component which directs it outward to the wall of the bag 16 also causing the filter bag to flex outwardly at this point. This secondary flexing action of the bag is subsequently propagated down the remaining length of the bag to reinforce flexing of the filter bag due to the rapid expansion of the compressed air which passes through the central hole 44 of the jet deflector.

The cooperation of the two cleaning actions present and the proportions of the total energy under which they combine are extremely critical in developing the most efficient arrangement for the jet deflectors. Accordingly, the ratio of the annular flow area 46 to the area of the central hole 44 is not allowed to exceed a proportion of approximately 10 to 1.

A further important consideration in our cleaning process is that the flexing action in the filter bag produced when the airjet from the nozzle 38 strikes the deflector 42 originates at the upper portion of the bag 16 adjacent the outer periphery of the annular deflector. Thus the dust cake collected on the outer surface of the bag first starts to break away therefrom adjacent the periphery of the deflector 42. As the flexing action of the filter is propagated down the bag, the filter cake tends to "break away " still more whereby it may fall by gravity to the hopper 48 at the lower part of the housing for removal necessary through removal door 50.

Another important action accompanying the use of the jet deflector 42 in the manner defined is that its use results in a quick increase of pressure above the deflector 42 within each bag. Thus residual flow of dirty air through the bag is quickly stopped and the cleaning operation more effectively accomplished.

Figure 2:
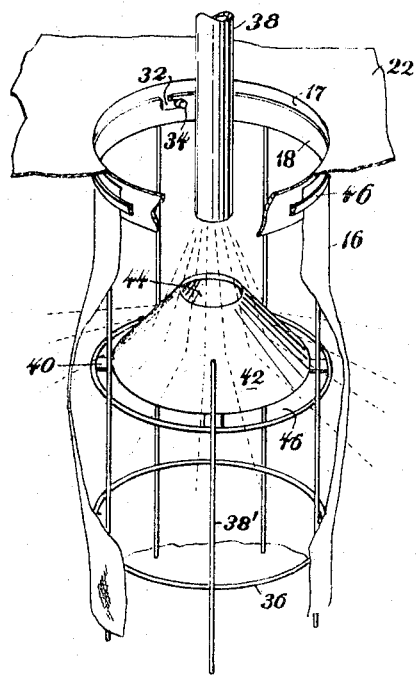
FIG. 2 is an enlarged detail drawing of a specific air deflector as used in a filter bag.
Figure 3:
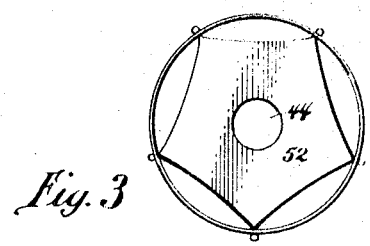
FIGS. 3 and 4 are plan views of modified forms of deflector plates.
Figure 4:
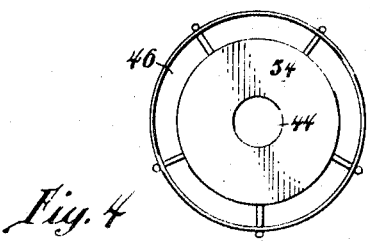

A preferred form of my invention is shown in FIG. 2 of the drawing where the jet deflector 42 assumes the shape of a truncated cone of light-gauge metal secured to the support rings 36 by welding the tabs 40 thereto. The outer diameter of the deflector is established to allow for an annular space 46 between it and the support cage at the same level, while the inside diameter of the opening 44 is established in accordance with the preferred ratio of areas above defined. Less effective variations of our invention are to be found in FIGS. 3 and 4 comprising plates 52 and 54 apertured in accordance with the above description.

While only several forms of the device have been defined it will be understood that the concepts described herein may be applicable to other sizes and shapes of apparatus employed for the stated purpose. It is thus to be understood that various changes may be made in the details of construction without departing from the spirit of the invention.

I claim:

1. An apparatus for filtering solids from fluids having a housing including an inlet for a dust-bearing gas and an outlet for a clean gas, an apertured partition intermediate said inlet and outlet dividing the housing into inlet and outlet compartments, a tubular filter bag having an open end and a closed end depending from said apertured partition and communicating with an aperture in said partition at the open end, a source of pressurized cleaning gas, cleaning means for the filter bag comprising a nozzle extending into the open end of the tubular filter bag and connected to said source for the exhaust of pressurized cleaning gas into the open end of the tubular filter bag, means for intermittently exhausting a blast of cleaning gas from said nozzle in opposition to the direction of clean gasflow through said filter bag, and an annular deflector adjacent the outlet end of the cleaning nozzle and at the upper end of the filter bag arranged to provide an annular space therearound and a central opening therethrough wherein the ratio of the area of the annular space to the central opening does not exceed approximately 10 to 1.

2. An apparatus for filtering solids from fluids as defined in claim 1 wherein the annular deflector is of frustoconical configuration with the apex thereof lying adjacent the outlet end of the cleaning nozzle to simultaneously direct a portion of the cleaning gas axially along said bag and deflect a portion of it radially on to the surface thereof.